June 2, 1953 W. G. LARSON ET AL 2,640,273
OUTSIDE DIAMETER GAUGE FOR SCREWS, ETC
Filed Oct. 13, 1949
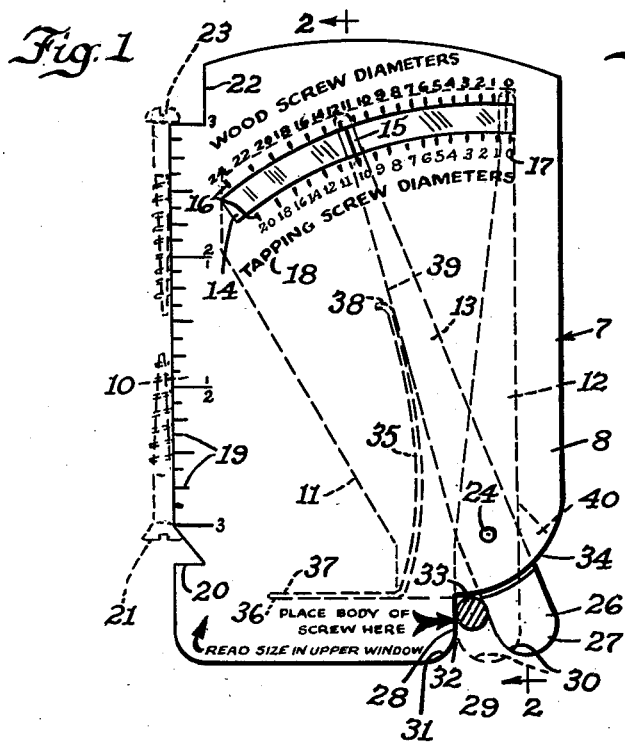
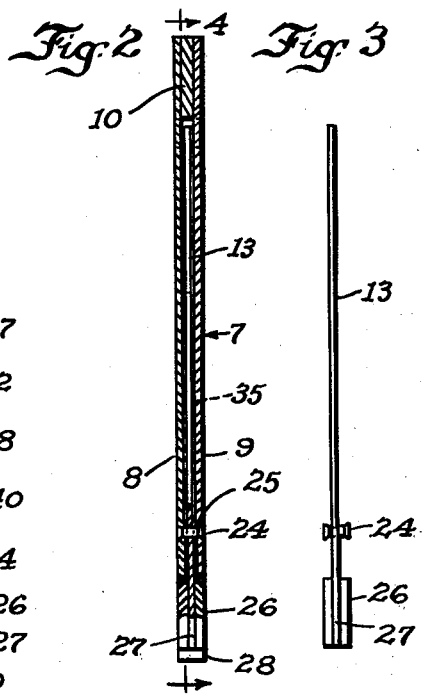
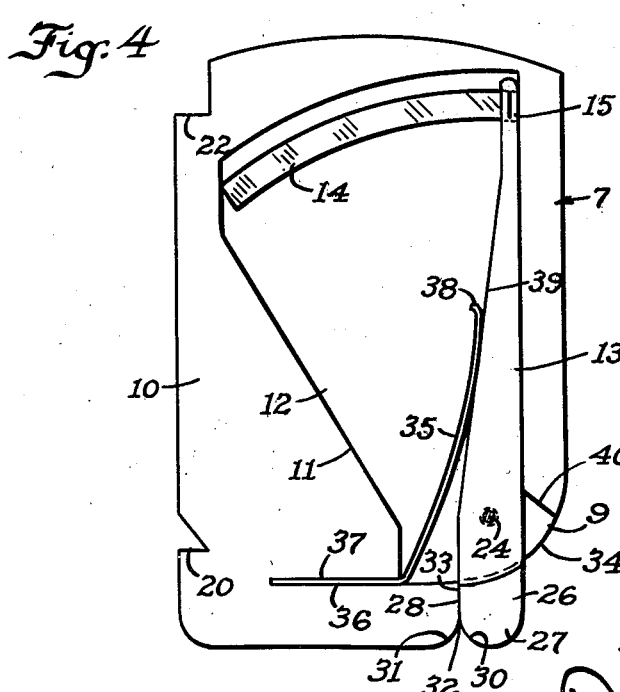
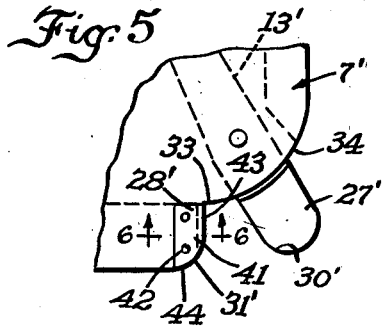
Inventors
Walter G. Larson
Elmer E. Broberg
Atty Patented June 2, 1953

2,640,273

UNITED STATES PATENT OFFICE 2,640,273

OUTSIDE DIAMETER GAUGE FOR SCREWS, ETC.

Walter G. Larson and Elmer E. Broberg, Rockford, Ill., assignors to Elco Tool and Screw Corporation, Rockford, Ill., a corporation of Illinois Application October 13, 1949, Serial No. 121,114

6 Claims. (Cl. 33—178)

This invention relates to gauges and is more particularly concerned with a gauge designed for measuring screws, although the invention is applicable generally for measurement of wire and other articles that are circular in cross-section.

The principal object is to provide a simpler and more economical and at the same time handier gauge of the type described.

The gauge of our invention has a pointer mounted for oscillatory movement relative to a graduated scale, marked to indicate the sizes of different kinds of screws, such as machine screws, wood screws, sheet metal screws, and so forth; and this indicator is spring pressed toward one extreme position for a zero reading, and has an operating handle on one end serving as the feeler or movable gauge jaw, which can be moved by hand away from a stationary jaw on the body or housing of the gauge against the resistance of a return spring, although the outer end of the handle portion is rounded and likewise the stationary jaw, both on a large enough radius to form a V into which the screw shank to be measured may be pushed to enter the same between the jaws to move the indicator directly to the size-indicating position.

Another object is to provide a gauge of the kind described designed to enable the use of sheet plastic material economically and at the same time provide for enclosure of all of the working parts, for their protection, certain portions of the sheet plastic material, which is transparent, being left transparent to provide windows on opposite sides of the gauge through which the pointer end of the indicator may be seen, whereas the backs of the sheets above and below the windows are rendered opaque by means of a reverse plate printing operation, or operations, in which the graduations and their identifying captions, and all other legends and advertising matter and printing of whatever matter, is applied at the same time.

The invention is illustrated in the accompanying drawing, in which—

Fig. 1 is a face view of a gauge made in accordance with our invention;

Fig. 2 is a longitudinal section, taken approximately on the line 2—2 of Fig. 1;

Fig. 3 is a side view of the indicator removed from the gauge;

Fig. 4 is a section on the line 4—4 of Fig. 2;

Fig. 5 is a face view of one corner portion of a gauge of modified or alternative construction, and Fig. 6 is a sectional detail on the line 6—6 of Fig. 5;

Similar reference numerals are applied to corresponding parts throughout these views.

Referring first to Figs. 1 to 4, the generally rectangular body or housing 7 is preferably, though not necessarily, made from three pieces of sheet plastic material suitably cemented together, the sheets 8 and 9 forming the opposed face portions, and the intermediate sheet 10 the spacer, the sheet 10 having a generally triangular-shaped opening 11 cut therein to leave a space 12 between the sheets 8 and 9 in which the indicator 13 can be housed for oscillatory movement. The sheets 8 and 9 are of transparent material, but are rendered opaque by printing on the inner side all over, with the exception of the arcuate window portions 14, whereby to make the pointer end 15 of the indicator 13 visible easily from both sides of the gauge. As a part of the printing on the inner sides of sheets 8 and 9, graduation marks 16 and captions 17 therefor are provided, as well as other legends 18, so that on one side of the gauge one may read, for example, wood screw diameters and tapping screw diameters, and on the other side machine screw diameters and wire gauges, or whatever other information may be desired. In like manner, a three inch scale is preferably provided along one edge of the gauge, readable from either or both sides of the gauge by printing the graduations 19 on the inner side of one or both of the sheets 8 and 9. This three inch scale can, of course, be used for various purposes, but we prefer to have a V-shaped notch 20 cut in the edge of the body of the gauge at one end of the three inch scale, as indicated at 20, to enable measuring the length of flat or oval-head screws, as indicated in dotted lines at 21 in Fig. 1, and at the other end of the three inch scale there is preferably provided a right angle notch 22 in the body of the gauge, to permit measuring the length of round and fillister head screws, as indicated in dotted lines at 23 in Fig. 1. Although sheet plastic material has been specified for the body of the gauge, it may, of course, be made of suitable cardboard, or composition material, in which event slots would, of course, be necessary for the windows 14, and the graduations and other printing would be applied to the outside.

The indicator 13 is pivoted in the gauge on a pin 24, the ends of which are received in registering holes 25 provided therefor in the sheets 8 and 9, these holes being counterbored to receive the upset ends of the pin, so as to prevent endwise displacement thereof from the gauge. The indicator 13 is preferably of plastic sheet material like the rest of the gauge, although it might, of course, be made of metal, like the indicator 13' of Fig. 5. Small tabs 26 of sheet plastic material are suitably secured, as by cementing, onto opposite sides of the outer end portion of the indicator, so as to provide a handle or feeler 27 adapted to serve as the movable jaw of the gauge of approximately the same thickness as the body of the gauge. The corner portion of the gauge is cut away in radially spaced relation to the pivot 24 of the indicator, to provide a straight edge 28 in spaced substantially parallel relation to the adjacent longitudinal edge of the body 7, the said straight edge defining the stationary jaw 28, with which the feeler or movable jaw 27 cooperates when measuring the diameter of a screw, as indicated at 29. The outer end of the feeler or movable jaw 27 is rounded, as indicated at 30, and likewise the outer end of the stationary jaw 28, as indicated at 31, whereby to define between these rounded portions a V-shaped entrance 32 into which the shank of the screw or wire, or other thing, to be measured can be thrust to force the feeler or movable jaw 27 away from the stationary jaw 28 and enter it in the corner 33, one side of which is formed by the stationary jaw 28 and the other side by one end of the rounded cut-away corner portion 34 of the body of the gauge. A return spring 35 is provided in the space 12 caged between the sheets 8 and 9 with its straight attaching end portion 36 anchored in a slot 37 provided therefor in the spacer 10. The spring 35 is preferably made of spring wire although a flat leaf spring may, of course, be provided, and its extreme outer end portion 38 is bent on an arc, so as to give an easy sliding or sled runner action in sliding along the straight edge portion 39 on the back of the indicator 13. This spring 35 is, of course, well protected by reason of its enclosure in the space 12, and, inasmuch as the indicator 13 closes the opening 40, left between the sheets 8 and 9, at the open corner portion of the spacer 10, there is no danger of any dirt or other foreign particles entering the space 12 when the gauge is carried in someone's pocket or is left lying around on a work bench.

As stated above, the indicator 13 may be made of metal, like the indicator 13' in Fig. 5, to reduce the likelihood of wear on the feeler or movable jaw portion 27 or 27', as this portion is numbered in Fig. 5. For a similar reason the stationary jaw may be faced with metal, as by application of a small U-shaped sheet metal clip 41 riveted, or otherwise suitably secured, to the body 7' of the gauge and having the outer surface 43 thereof forming the stationary jaw 28'. The outer end portion of the sheet metal clip 41 is cut away on an arc, as indicated at 44, to conform to the arc 31' of the rounded corner portion of the gauge body, so that this rounded corner 31' cooperates with the rounded corner 30' on the feeler 27 to define a V therebetween, as at 32 in Figs. 1 and 4, for the purposes mentioned previously.

It is believed the foregoing description conveys a good understanding of the objects and advantages of our invention. The appended claims have been drawn to cover all legitimate modifications and adaptations.

We claim:

1. A gauge for outside measurements, such as the diameter of screws, et cetera, comprising a generally rectangular card-like body member on which measurement graduations are arranged in an arc struck from a center located in one corner portion of the rectangular body member, a portion of the last mentioned corner portion of said body member being cut away to define a straight edge substantially parallel to and spaced laterally from an adjacent edge of said body member and constituting a stationary jaw against which the cylindrical part to be measured may be engaged transversely of the jaw, and an elongated pointer pivoted at one end on said body member substantially at the center of said arc and near one corner of said body member, said pointer having a feeler or handle extension on its pivoted end disposed in the cut-away corner portion and providing on its one side a straight edge adapted to have flush engagement with the straight edge defining the stationary jaw and defining a movable jaw movable toward and away from said stationary jaw.

2. A gauge as set forth in claim 1 wherein the stationary jaw portion of said body member and the adjoining side of the pointer are rounded on the abutting outer corners, whereby an entrance of inwardly narrowing form is defined between the outer portions of the stationary jaw and the pointer to facilitate entry between said parts of an article to be measured.

3. A gauge for outside measurements, such as the diameter of screws, et cetera, comprising a generally rectangular card-like body formed by a pair of spaced sheets of material, at least one of which has an arcuate window portion and measurement graduations arranged in an arc concentric with and adjacent the arcuate window, and an elongated pointer movable relative to and visible through the window and pivoted at one end between said sheets substantially at the center of said arcs and near one corner of said body, said corner portion of the two sheets being cut away adjacent the pivot to define a straight edge substantially parallel to and spaced laterally from an adjacent edge of said body and constituting a stationary jaw on said body against which the cylindrical part to be measured may be engaged transversely, and said pointer having a feeler or handle extension on its pivoted end disposed in the cut-away corner portion and providing on its one side a straight edge adapted to have flush engagement with the straight edge defining the stationary jaw and defining a movable jaw movable toward and away from said stationary jaw.

4. A gauge for outside measurements, such as the diameter of screws, et cetera, comprising a generally rectangular card-like body formed by a pair of spaced sheets of material, at least one of which has an arcuate window portion and measurement graduations arranged in an arc concentric with and adjacent the arcuate window, a spacer sheet between the pair of sheets and secured thereto, said spacer sheet being cut away centrally to define a generally segmental shaped space for a pointer, the center of said arc being at the apex of said segmental space, an elongated pointer movable relative to and visible through the window and oscillatable freely in said space between said first mentioned sheets and pivoted at one end substantially at the center of said arcs and near one corner of said body, said corner portion of the three sheets being cut away to define a straight edge substantially parallel to and spaced laterally from an adjacent edge of said body and constituting a stationary jaw on said body against which the cylindrical part to be measured may be engaged transversely, and said pointer having a feeler or handle extension on its pivoted end disposed in the cut-away corner portion and providing on its one side a straight edge adapted to have flush engagement with the straight edge defining the stationary jaw and defining a movable jaw movable toward and away from said stationary jaw.

5. A gauge for outside measurements, such as the diameter of screws, et cetera, comprising a generally rectangular card-like body formed by a pair of spaced sheets of material, at least one of which has an arcuate window portion and measurement graduations arranged in an arc concentric with and adjacent the arcuate window, and an elongated pointer movable relative to and visible through the window and pivoted at one end between said sheets substantially at the center of said arcs and near one corner of said body, said corner portion of the two sheets being cut away adjacent the pivot to define a straight edge substantially parallel to and spaced laterally from an adjacent edge of said body member and constituting a stationary jaw on said body against which the cylindrical part to be measured may be engaged transversely, and said pointer having a feeler or handle extension on its pivoted end disposed in the cut-away corner portion and providing a movable jaw movable toward and away from said stationary jaw, and an elongated leaf spring disposed between the first mentioned sheets alongside and abutting said pointer in the segmental shaped spaced and adapted to urge the pointer toward one limit position, said spring having one end portion anchored in a slot provided therefor in the spacer sheet.

6. A gauge for outside measurements, such as the diameter of screws, et cetera, comprising a generally rectangular card-like body formed by a pair of spaced parallel sheets of material, at least one of which has an arcuate window portion and measurement graduations arranged in an arc concentric with and adjacent the arcuate window, an elongated pointer disposed between said sheets and pivoted near one end for movement of the end portion remote from the pivoted end relative to the window, the pointer pivot being substantially at the center of said arcs and near one corner of said body, that corner portion of the two sheets being cut away in outwardly spaced relation to the pivot of said pointer to define a straight edge substantially parallel to and spaced laterally from an adjacent edge of said body and constituting a stationary jaw against which the cylindrical part to be measured may be engaged transversely of the jaw, said pointer having a combination feeler and operating handle extension on its pivoted end disposed in the cut-away corner portion of said body and providing on its one side a straight edge adapted to have flush engagement with the straight edge defining a stationary jaw, and defining a movable jaw movable toward and away from said stationary jaw, and an elongated leaf spring disposed between said sheets and anchored at one end and having its other end slidably abutting said pointer to urge it toward one limit position.

WALTER G. LARSON.
ELMER E. BROBERG.

References Cited in the file of this patent
UNITED STATES PATENTS

| Number | Name | Date |
|---|---|---|
| 438,300 | Edison | Oct. 14, 1890 |
| 920,051 | Guerineau | Apr. 27, 1909 |
| 1,121,289 | Robertson | Dec. 15, 1914 |
| 1,751,366 | Shaub | Mar. 18, 1930 |
| 1,890,827 | Pratt | Dec. 13, 1932 |
| 2,134,262 | Phillips | Oct. 25, 1938 |
| 2,236,443 | Oboler | Mar. 25, 1941 |
| 2,362,907 | Levin | Nov. 14, 1944 |
| 2,374,830 | Nock | May 1, 1945 |
| 2,526,056 | Weston | Oct. 17, 1950 |